INVENTOR
JEAN LEBLOND
BY Jack Rosin
ATTORNEY

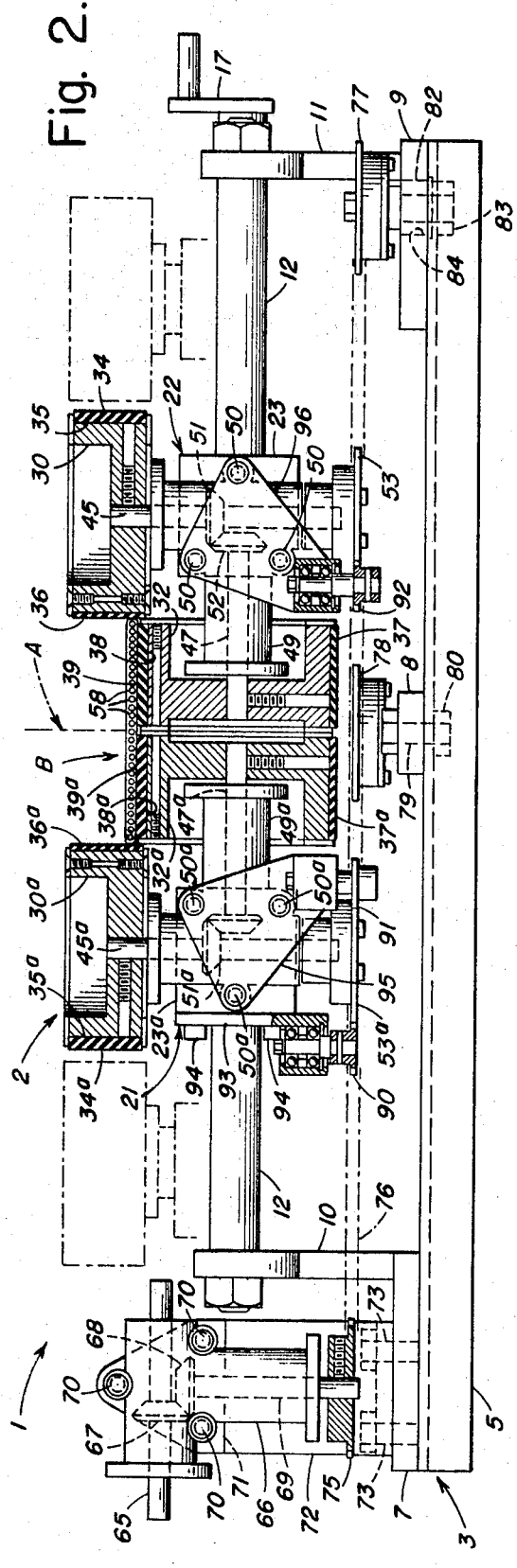

United States Patent Office 3,537,936
Patented Nov. 3, 1970

3,537,936
TIRE FABRIC ALIGNMENT MECHANISM
Jean Leblond, Compiegne, France, assignor to Uniroyal Engelbert France S.A., Paris, France, a corporation of France
Filed June 7, 1967, Ser. No. 644,175
Claims priority, application France, Feb. 17, 1967, 95,536
Int. Cl. B29h 17/20; B65h 17/34
U.S. Cl. 156—405     2 Claims

ABSTRACT OF THE DISCLOSURE

A device for maintaining a length of tire building material along a predetermined course during movement of the material through the device, comprising a pair of endless belts forming a horizontal, moving support surface for supporting the material as it passes through the device, and a pair of driven endless belts forming vertical, horizontally spaced moving surfaces for contacting and guiding the side edges of the material as it passes through the device, each belt in each pair being movable toward and away from the other belt in each pair to accommodate passage of different widths of material through the device.

---

The foregoing abstract is neither intended to define the invention disclosed in this specification, nor is it intended to be limiting as to the scope of the invention in any way.

BACKGROUND OF THE INVENTION

This invention pertains to tire building apparatus and, more particularly, to an apparatus for adjusting longitudinally moving breaker strips relative to a reference plane.

In various tire building operations it is necessary to accurately adjust a longitudinally moving, tacky breaker strip relative to a reference plane, such as the mid-circumferential plane of a tire building drum, in order to insure that finished pneumatic tires incorporating such strips will be of uniform high quality. One prior art apparatus for performing this function (see, e.g., Canadian Pat. No. 699,179) comprises a stationary supporting plate for supporting the breaker strip during its movement through the apparatus, and a pair of endless guide belts positioned one on each side of the support plate, the guide belts having flights engageable with the side edges of the breaker strip and being frictionally driven by the breaker strip, the flights extending in parallel relationship in a direction parallel to the desired direction of the movement of the breaker strip.

Although the aforesaid prior art device satisfactorily provides for coarse adjustments of the breaker strip relative to the reference plane, precision adjustments are difficult to achieve with this device. One reason for this is that the breaker strip, being tacky, tends to stick to the stationary support plate at random points, causing transverse forces to develop which tend to misalign the breaker strip and the reference plane. Another reason is that the guide belts are frictionally driven by virtue of their contact with the breaker strip and, depending on the contact pressure between the guide belts and the side edges of the breaker strip, varying torsional forces can be applied to the breaker strip to cause misalignment.

In accordance with the present invention, the drawbacks of the prior art breaker strip adjusting device are overcome, and precise positioning of the breaker strip relative to the reference plane is accomplished by providing in such devices (1) a breaker strip supporting surface which moves in synchronism with the breaker strip and (2) a positive drive for the endless guide belts.

Accordingly, one object of this invention is to provide improved apparatus for use in tire building operations.

Another object of this invention is to provide improved apparatus for adjusting a longitudinally moving strip of breaker material relative to a reference plane.

An additional object of this invention is to provide an improved centralizing device for positioning breaker strips centrally with respect to the mid-circumferential plane of a tire building drum.

Further objects and advantages of this invention will become apparent as the following description proceeds.

SUMMARY OF THE INVENTION

Briefly stated, and in accordance with one embodiment of this invention, improved apparatus for adjusting a longitudinally moving strip of breaker material relative to a reference plane comprises a frame, conveying means on the frame forming a generally horizontal, longitudinally moving surface for movably supporting the strip, first and second carriage means supported on the frame at opposite sides of the reference plane for movement toward and away from one another and the reference plane, each of the carriage means including an endless belt forming a generally vertical, longitudinally movable surface for contacting the side edges of this strip, and means independent of the strip for driving one or more of the movable surfaces at a predetermined speed.

BRIEF DESCRIPTION OF THE DRAWINGS

While the specification concludes with claims particularly pointing out and distinctly claiming the subject matter regarded as the invention herein, it is believed that the invention will be better understood from the following description taken in conjunction with the accompanying drawings, in which:

FIG. 2 is an end elevational view of said device, with portions cut away for clarity, taken along the line 2—2 of FIG. 1.

FIG. 3 is a side elevational view of said device, with portions cut away for clarity, taken along the line 3—3 of FIG. 1; and, FIG. 4 is a fragmentary sectional, elevational view of a portion of said device, taken along the line 4—4 of FIG. 1.

DESCRIPTION OF THE PREFERRED EMBODIMENTS

Figure 1:
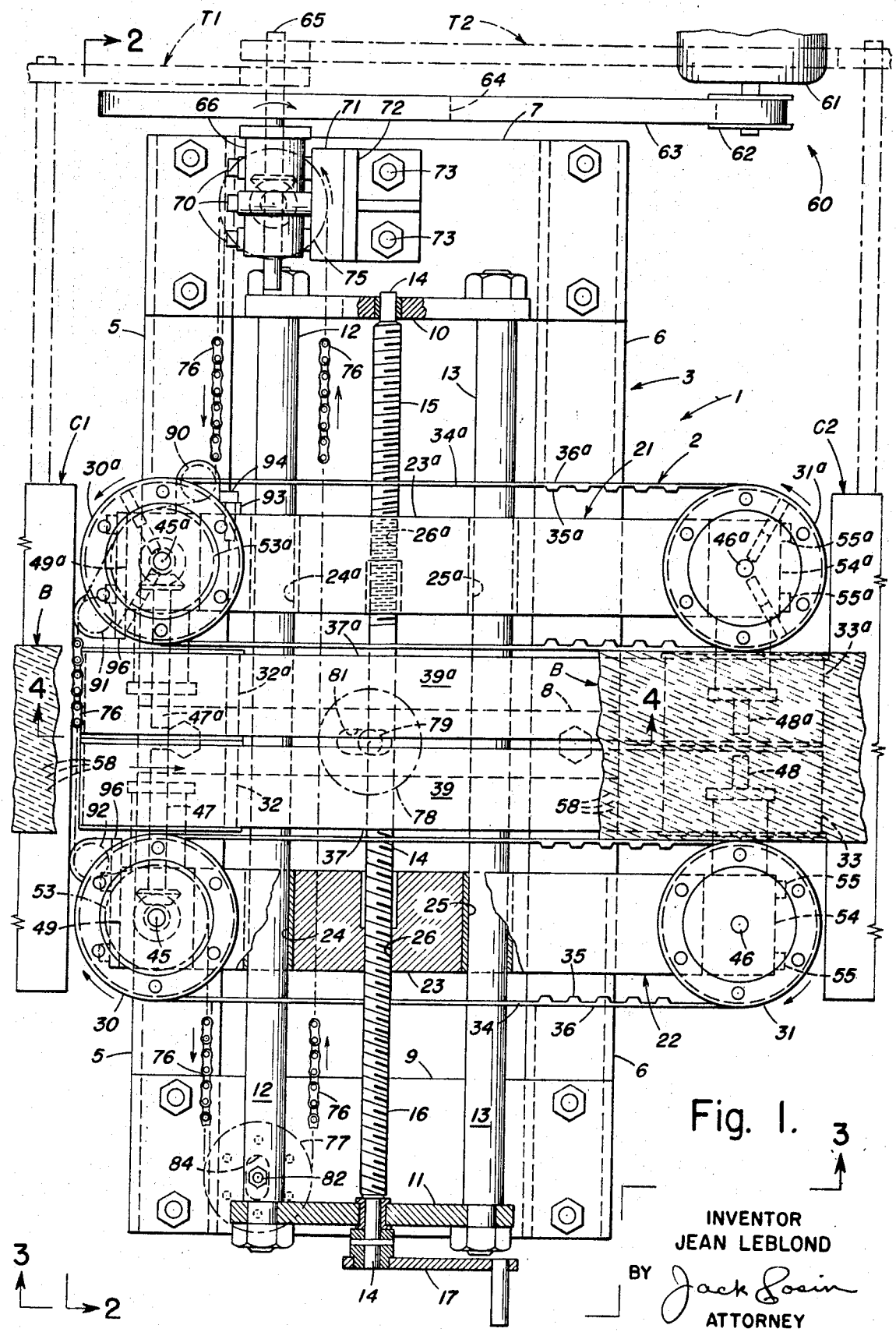
FIG. 1 is a plan view, with portions cut away for clarity, of a preferred breaker strip adjusting device in accordance with this invention.

Referring to the figures, a breaker strip adjusting device in accordance with this invention has been illustrated generally at 1. The device 1 comprises a breaker strip guide and support assembly, shown generally at 2, which is carried on a frame, shown generally at 3.

The frame 3 includes first and second channel support members 5 and 6 (FIG. 3), respectively, which are interconnected at three points along their length by cross members 7, 8 and 9 (FIG. 2). Cross members 7 and 9 are provided with generally similar vertical bracket portions 10 and 11, respectively, which are interconnected by spaced rods 12 and 13 (FIG. 1). Rods 12 and 13 serve as supports on which the guide and support assembly 2 is adjustably carried.

A lead screw 14 is rotatably mounted in and extends between bracket portions 10 and 11 of frame 3. Lead screw 14 is provided with a conventionally threaded first portion 15 thereon and with an oppositely threaded second portion 16 thereon. The threaded portions 15 and 16 engage correspondingly threaded members in the guide and support assembly 2, as will be described in greater detail hereinafter. A hand crank 17, which is keyed to the lead screw 14, is employed in rotating the screw in order to effect adjustments of the setting of the guide and support assembly 2.

Referring more particularly to FIG. 2, the guide and support assembly 2 comprises first and second carriage means, shown generally at 21 and 22, respectively. Carriage means 21 and 22 are supported on frame 3 at opposite sides of a reference plane A for movement toward and away from one another and said reference plane, such movement being between the positions shown in solid lines in FIG. 2 and the positions shown in broken lines in FIG. 2.

The carriage means 21 and 22 are essentially mirror images of one another. Accordingly, the following description of carriage means 22 will be understood to apply also to carriage means 21. For convenience and clarity, corresponding elements in carriage means 21 and 22 will be identified in the drawings by the same numerals, except that the numerals identifying elements of carriage means 21 will have the subscript "a" appended thereto.

Carriage means 22 comprises a generally rectangular sliding block 23 which is provided with apertures (see FIG. 1) in which bushings 24 and 25 are mounted. The support rods 12 and 13 pass through bushings 24 and 25, and the bushings are in sliding engagement with the rods. Block 23 is also provided with a threaded aperture 26 which engages the threads 16 of lead screw 14. The threads of aperture 26 are of the same hand as the threads 16 of lead screw 14. Accordingly, rotation of lead screw 14 causes the sliding block 23 to move towards or away from the reference plane A, depending on the direction of rotation given the lead screw.

Recalling that the threads 15 of lead screw 14 are opposite in hand to the threads 16 on the lead screw, it will be apparent that rotation of the lead screw 14 in a direction to move sliding block 23 toward reference plane A will also result in the movement of sliding block 23a toward the reference plane A. Similarly, rotation of lead screw 14 in the opposite direction will cause each of the sliding blocks 23 and 23a to move away from the reference plane A.

Carriage means 22 is provided with a first pair of gears 30 and 31 (FIG. 1) disposed with their axes vertical and with a second pair of gears 32 and 33 (FIG. 3) disposed with their axes horizontal. Gears 30 and 31 are interconnected by an endless belt 34 having a toothed inner surface 35 and a smooth outer surface 36. Gears 32 and 33 are interconnected by an endless belt 37 having a toothed inner surface 38 and a smooth outer surface 39. Gears 30, 31, 32 and 33 are fixed to and rotate with respective shafts 45, 46, 47 and 48.

Referring to FIG. 2, shafts 45 and 47 are rotatably supported by bearings (not shown) in a T-shaped housing 49 which is fastened to one end of sliding block 23 by bolts 50. Shafts 45 and 47 each have keyed thereto respective bevel gears 51 and 52 which are in driving engagement with one another, the bevel gear 52 being at the end of shaft 47 opposite gear 32 and the bevel gear 51 being midway between the ends of the shaft 45. Shaft 45, at its end opposite gear 30, is provided with a drive sprocket 53 which is keyed to the shaft. Accordingly, upon rotation of sprocket 53, in a manner to be described in greater detail hereinafter, shafts 45 and 47 are rotated. Shafts 45 and 47, in turn, rotate gears 30 and 32 and, due to the endless belts 34 and 39, the gears 31 and 33 are also rotated.

Referring to FIGS. 1 and 3, shafts 46 and 48 are supported in a T-shaped housing 54 which is similar to the housing 49. Bevel gears (not shown) similar to bevel gears 51 and 52 couple shafts 46 and 48 together to insure that the two shafts rotate in synchronism. Housing 54 is fastened by bolts 55 to the end of sliding block 23 opposite from housing 49.

Referring to FIGS. 1 and 2, a breaker strip has been illustrated generally at B in the breaker strip adjusting device 1. The breaker strip B, which conventionally comprises a plurality of cables or cords 58 of metal, textile or other suitable reinforcing material embedded in rubber at a predetermined angle to the longitudinal centerline of the strip, has been cut away in FIG. 1 in order to increase the clarity of the drawing. However, it will be understood that the adjusting device 1 may be employed either to adjust discrete lengths of breaker strip material or to adjust a continuous length of the material prior to its being cut to discrete lengths.

As shown in FIG. 1, the breaker strip B is adjusted by the device 1 as it passes from a first conveyor, shown generally at C1, through the device 1 to a second conveyor, shown generally at C2. The adjusted breaker strip B may, in accordance with conventional practices, thereafter be brought to a tire building drum (not shown) by conveyor C2, with the centerline of the breaker strip aligned to (or offset by a predetermined amount from) the mid-circumferential plane of the drum.

In order that the breaker strip B will be smoothly transferred from conveyor C1 to adjusting device 1 and then to conveyor C2, the moving surfaces on each of the three units are maintained at equal speeds by means of, for example, the driving means shown generally at 60 (FIG. 1) or by any other suitable direct or indirect driving means that is connected with the movable surfaces in any appropriate manner and drives each of the movable surfaces at the same linear velocity. Driving means 60 comprises an electric motor 61 which drives a gear 62 mounted on its output shaft. Gear 62, in turn, engages the inner surface of a toothed belt 63 which rotates a gear 64 keyed to the input shaft 65 of the device 1. Suitable toothed power take-off belts T1 and T2, shown in broken lines in FIG. 1, may be coupled to shaft 65 for driving the conveyors C1 and C2 in synchronism with the moving surfaces of the device 1.

The input shaft 65 (FIG. 2) forms part of a right angle drive mechanism 66 which includes bevel gears 67 and 68 and an output shaft 69. The right angle drive 66 is fastened by means of bolts 70 to a block 71 (FIG. 1) carried by a bracket 72 fastened to support member 7. Bolts 73 are employed in fastening the bracket 72 to the cross member 7.

The lower end (FIG. 2) of output shaft 69 is provided with a sprocket 75 which is rigidly fixed thereto. Sprocket 75 is in driving engagement with an endless chain 76 (FIG. 1), the circuit of which proceeds about the drive sprockets 53a and 53 and about adjustably positioned idler sprockets 77 and 78 which serve as slack take-up sprockets.

As shown more clearly in FIG. 4, the idler sprocket 78 is adjustably fixed to the cross member 8 by means of a bolt 79, a nut 80 and an elongated slot 81 formed in cross member 8. The bolt 79 passes through cross member 8 by means of slot 81 and, by loosening nut 80 on bolt 79, sprocket 78 may be moved towards or away from the chain 76 (see FIG. 1) to tighten or loosen the chain in its endless path. As shown in FIGS. 1 and 2, the sprocket 77 is adjustably mounted in the cross member 9 by means of a bolt 82, a nut 83 and an elongated slot 84 formed in the cross member 9, the adjustability of sprocket 77 being for the same purpose as in the case of sprocket 78.

Suitable small idler sprockets 90, 91 and 92 (FIGS. 1 and 2) are employed for direction changing purposes to insure that the chain 76 engages substantial portions of the drive sprockets 53 and 53a in its movement along its endless path. Idler sprocket 90 is rotatably carried by a bracket 93 (FIG. 2) which is fastened to sliding block 23a by means of bolts 94. Idler sprocket 91 is rotatably carried by a bracket 95 which is fastened to T-shaped housing 49a and sliding block 23a by means of the bolts 50a. Idler sprocket 92 is rotatably carried by a bracket 96 which is fastened to T-shaped housing 49 and sliding block 23 by means of the bolts 50.

From the foregoing, it will be seen that the rotation of input shaft 65 by driving means 60 causes drive sprocket 73 to move endless chain 76 along its circuitous course. As a result, sprocket 53a of carriage means 21 is rotated, driving gears 30a and 32a. Accordingly, toothed belts 34a and 37a are driven and their respective smooth outer surfaces 36a and 39a form longitudinally moving surfaces for, respectively, movably supporting the breaker strip B and contacting the side edges of the breaker strip to adjust the same relative to the reference plane A.

Similarly, the movement of endless chain 76 along its circuitous course initiates rotation of sprocket 53 of carriage means 22, driving gears 30 and 32. Accordingly, toothed belts 34 and 37 are driven and their respective smooth outer surfaces 36 and 39 cooperate with and perform the same function as the corresponding surfaces 36a and 39a of carriage means 21.

It will be apparent from inspection of FIG. 1 that the driving arrangement by which chain 76 drives gears 53 and 53a permits hand crank 17 to be freely rotated in order to move the carriages 21 and 22 away from one another to accommodate wider breaker strips B. It will also be apparent that, since the threaded portions 15 and 16 of the lead screw 14 are equal but opposite in pitch, upon rotation of hand crank 17 the reference plane A will always be centrally positioned relative to the opposed vertical surfaces 36 and 36a (FIG. 2). Accordingly, the surfaces 36 and 36a act to centralize the moving breaker strip B relative to the reference plane A, assuming that the carriages 21 and 22 were aligned with the reference plane upon initial assembly of device 1.

The foregoing endless chain driving arrangement is, of course, not the only means available for driving the endless belts 34, 34a, 37 and 37a in a manner which allows the carriages 21 and 22 to be adjusted toward and away from one another to accommodate different width breaker strips B. It will be apparent that any other sutiable arrangement which has the same effect, namely the driving in synchronization and at the same velocity of the endless belts, may be employed, such as a splined shaft having gears slidable thereon which are coupled to the gears 30, 30a 32 and 32a and allow adjustment of the carriages along the length of the splined shaft.

It will be obvious to those skilled in the art that by offsetting reference plane A a predetermined amount from a plane which corresponds to the mid-circumferential plane of the tire building drum or former with which the device 1 is associated, the longitudinal centerline of the breaker strip B can be adjusted to a position that will be offset from such plane. This feature is sometimes employed in the building of asymmetric radial ply tires wherein the longitudinal centerlines of one or more breaker strips are intentionally offset from the mid-circumferential plane of the drum or former in order to introduce a predetermined amount of planned dissymmetry into the finished tires.

It will be further apparent to those skilled in the art that an alternate form of the adjusting device 1 may be employed in which a single, wider endless belt is used to support the breaker strip B in the place of the two endless belts 37 and 37a. The wider belt would be independent of both of the carriage means 21 and 22 and could be supported on the frame 3 in such a manner as to form a generally horizontal, longitudinally movable surface. In this case rotation of handwheel 17 would only separate the vertically disposed endless belts 34 and 34a, while the location of the horizontally disposed belt remains unchanged.

In another form of the adjusting device 1 the two horizontally disposed endless belts 37 and 37a and their respective pairs of gears 32 and 33 and 32a and 33a may be supported from the frame 3, instead of from the carriage means 21 and 22, and a suitable interconnection between sprocket 78 and one of the gears of each pair 32 and 33 and 32a and 33a can be utilized to drive the endless belts. Here, again, rotation of the handwheel 17 would only cause separation of the vertically disposed endless belts 34 and 34a, while the locations of the horizontally disposed belts remain unchanged.

In each of the foregoing alternate forms of the invention, the surface or surfaces which correspond to surfaces 39 and 39a would still comprise a longitudinally movable surface for supporting the breaker strip B during its movement through the device 1, and the transversely adjustable vertical movable surfaces 36 and 36a would still contact the side edges of and provide for adjustment of the breaker strip relative to the reference plane A.

Having thus described the invention, what is claimed and desired to be protected by Letters Patent is:

1. Apparatus for adjusting a longitudinally moving strip of flexible, tacky, tire building fabric relative to a reference plane, comprising a frame; first and second carriage means supported on said frame for transverse movement toward and away from one another and said reference plane, each of said carriage means including therein (1) a first endless belt tarnsversely movable therewith and having a generally horizontal, longitudinally movable surface for supporting said strip and (2) a second endless belt transversely movable therewith and having a generally vertical, longitudinally movable surface for contacting the side edges of said strip to transversely shift said strip; and means independent of said strip of fabric for driving each of said horizontal and vertical movable surfaces on each carriage in the same predetermined direction at the same predetermined speed, whereby said flexible, tacky, tire building fabric may be adjusted relative to said reference plane with a minimum of wrinkling and disorientation of the fabric during longitudinal movement thereof through said apparatus.

2. Apparatus as described in claim 1, each of said endless belts being provided with a toothed inner surface, each of said inner surfaces being in engagement with respective first and second spaced gears, said driving means driving each of said endless belts through at least one or the other of the respective first and second gears engaged by said belts.

References Cited

UNITED STATES PATENTS

| | | | |
|---|---|---|---|
| 2,679,313 | 5/1954 | Gueffroy et al. | 198—165 XR |
| 3,352,403 | 11/1967 | Blake | 198—165 XR |
| 3,395,784 | 8/1968 | Kanarek | 198—165 XR |
| 3,413,174 | 11/1968 | Porter | 156—405 |

FOREIGN PATENTS 1,025,321   4/1966   Great Britain.

BENJAMIN A. BORCHELT, Primary Examiner

S. C. BENTLEY, Assistant Examiner

U.S. Cl. X.R.

226—172